US009048759B2

(12) United States Patent
Xu et al.

(10) Patent No.: US 9,048,759 B2
(45) Date of Patent: Jun. 2, 2015

(54) MULTISTAGE FORCE AMPLIFICATION OF PIEZOELECTRIC STACKS

(75) Inventors: Tian-Bing Xu, Hampton, VA (US); Emilie J. Siochi, Newport News, VA (US); Lei Zuo, Nesconset, NY (US); Xiaoning Jiang, Cary, NC (US); Jin Ho Kang, Newport News, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 288 days.

(21) Appl. No.: 13/293,846

(22) Filed: Nov. 10, 2011

(65) Prior Publication Data

US 2012/0119620 A1    May 17, 2012

Related U.S. Application Data

(60) Provisional application No. 61/414,815, filed on Nov. 17, 2010, provisional application No. 61/414,807, filed on Nov. 17, 2010, provisional application No. 61/414,803, filed on Nov. 17, 2010.

(51) Int. Cl.
*H01L 41/00* (2013.01)
*H02N 2/04* (2006.01)
*H02N 2/18* (2006.01)

(52) U.S. Cl.
CPC .............. *H02N 2/043* (2013.01); *H02N 2/186* (2013.01)

(58) Field of Classification Search
CPC .... H01L 41/083; H01L 41/0926; H01L 41/09

USPC .................................................. 310/328, 339
See application file for complete search history.

(56) References Cited

U.S. PATENT DOCUMENTS

| 4,845,688 | A |  | 7/1989 | Butler |
| 4,999,818 | A |  | 3/1991 | Malleolo |
| 5,276,657 | A |  | 1/1994 | Newnham et al. |
| 5,729,077 | A |  | 3/1998 | Newnham et al. |
| 6,232,702 | B1 |  | 5/2001 | Newnham et al. |
| 6,407,484 | B1 |  | 6/2002 | Oliver et al. |
| 6,465,936 | B1 | * | 10/2002 | Knowles et al. .............. 310/328 |
| 6,614,143 | B2 |  | 9/2003 | Zhang et al. |

(Continued)

FOREIGN PATENT DOCUMENTS

JP    08107239 A    4/1996

*Primary Examiner* — Derek Rosenau
*Assistant Examiner* — Bryan Gordon
(74) *Attorney, Agent, or Firm* — Jennifer L. Riley; Thomas K. McBride, Jr.

(57) ABSTRACT

Embodiments of the disclosure include an apparatus and methods for using a piezoelectric device, that includes an outer flextensional casing, a first cell and a last cell serially coupled to each other and coupled to the outer flextensional casing such that each cell having a flextensional cell structure and each cell receives an input force and provides an output force that is amplified based on the input force. The apparatus further includes a piezoelectric stack coupled to each cell such that the piezoelectric stack of each cell provides piezoelectric energy based on the output force for each cell. Further, the last cell receives an input force that is the output force from the first cell and the last cell provides an output apparatus force In addition, the piezoelectric energy harvested is based on the output apparatus force. Moreover, the apparatus provides displacement based on the output apparatus force.

27 Claims, 7 Drawing Sheets

(56) References Cited

U.S. PATENT DOCUMENTS

| | | |
|---|---|---|
| 6,623,111 B2 | 9/2003 | Nakatani |
| 6,629,922 B1 | 10/2003 | Puria et al. |
| 6,717,333 B2 | 4/2004 | Hermle et al. |
| 6,895,825 B1* | 5/2005 | Barkhoudarian ......... 73/861.28 |
| 6,927,528 B2* | 8/2005 | Barillot et al. ................ 310/325 |
| 6,994,110 B2 | 2/2006 | Barillot et al. |
| 7,227,295 B2 | 6/2007 | Or et al. |
| 7,355,325 B2 | 4/2008 | Johansson et al. |
| 7,394,181 B2 | 7/2008 | Su et al. |
| 7,446,459 B2* | 11/2008 | Xu et al. ....................... 310/339 |
| 7,453,187 B2 | 11/2008 | Richards et al. |
| 7,498,681 B1 | 3/2009 | Kellogg et al. |
| 7,663,294 B2 | 2/2010 | Ruggeri et al. |
| 7,692,366 B2 | 4/2010 | Thiesen |
| 7,768,177 B2 | 8/2010 | Yang et al. |
| 2005/0057123 A1* | 3/2005 | Deng ........................... 310/339 |
| 2008/0238260 A1 | 10/2008 | Xu et al. |
| 2009/0115292 A1* | 5/2009 | Ueda et al. .................... 310/338 |
| 2009/0127982 A1* | 5/2009 | Praino et al. .................. 310/367 |
| 2010/0019620 A1 | 1/2010 | Kastl et al. |
| 2010/0044459 A1 | 2/2010 | Xu et al. |
| 2010/0096949 A1 | 4/2010 | Xu et al. |

* cited by examiner

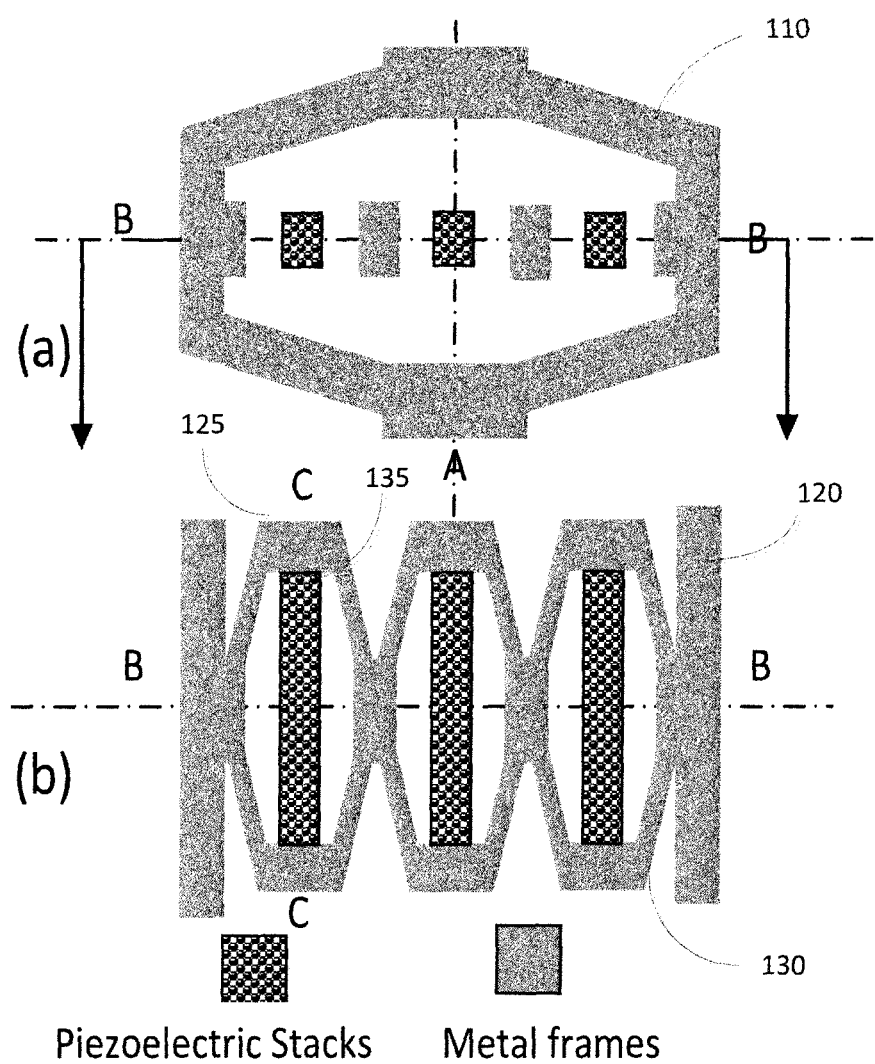
Piezoelectric Stacks    Metal frames
Figure 1A & B

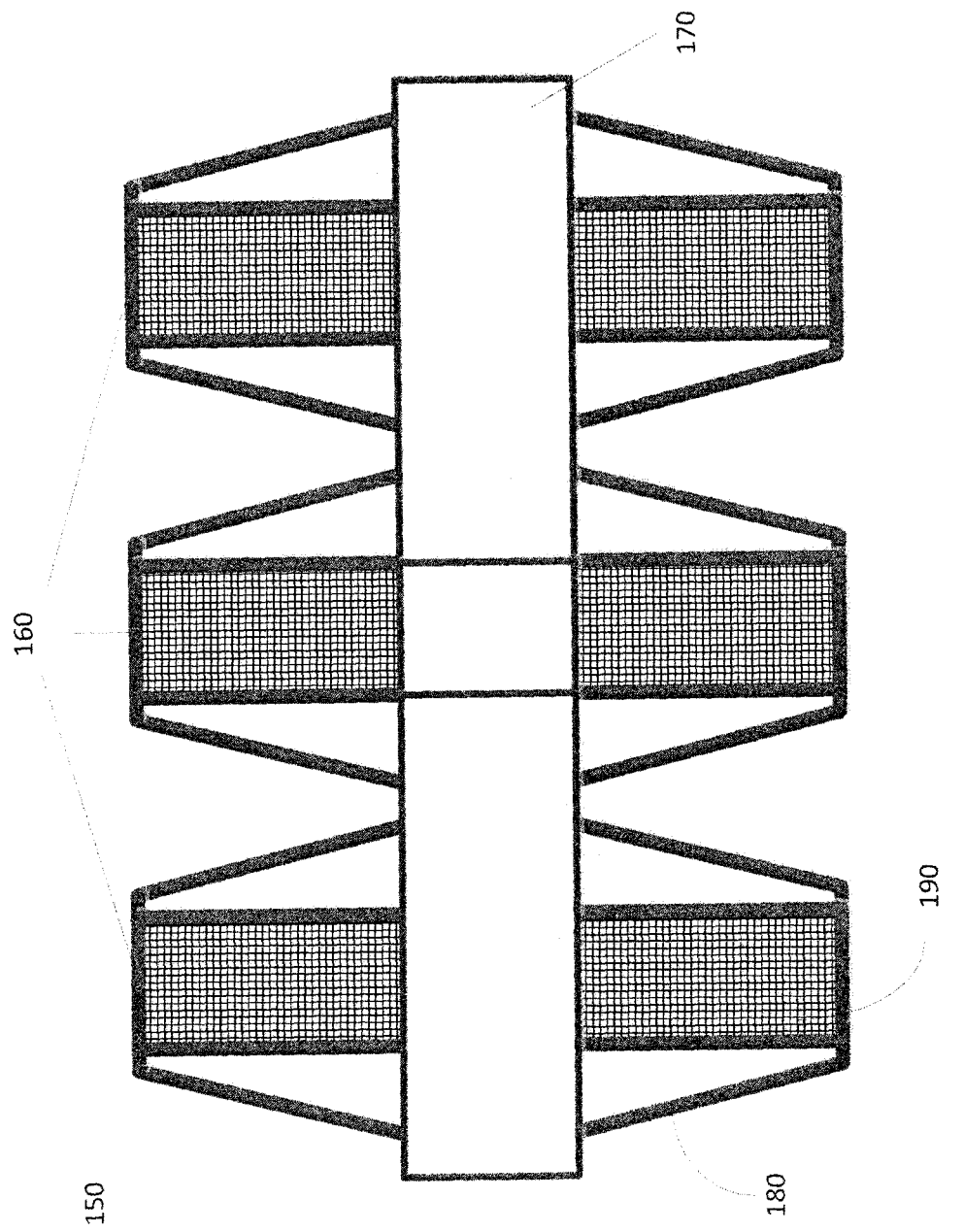

FIGURE 3
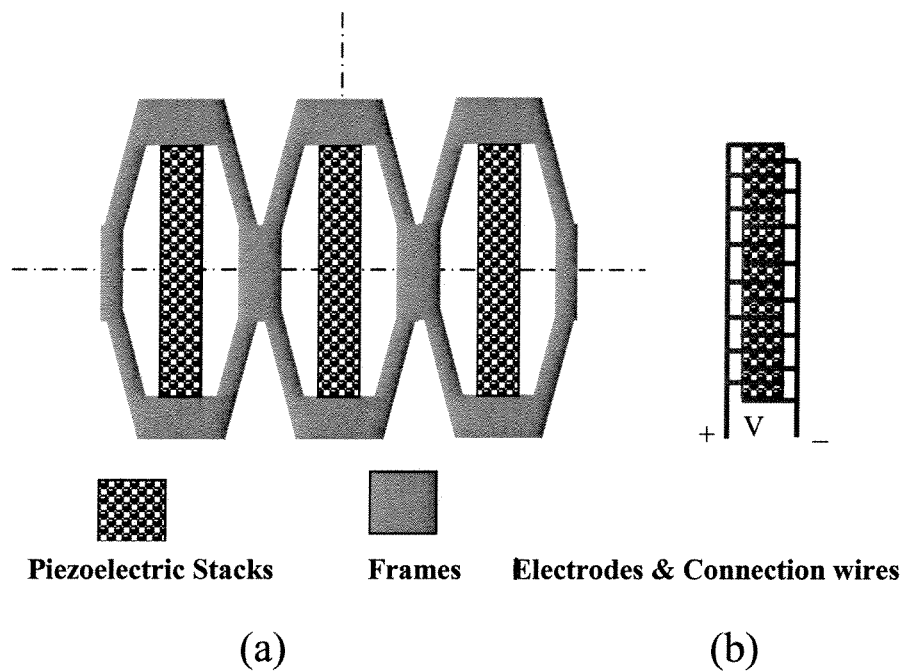
Piezoelectric Stacks   Frames   Electrodes & Connection wires
(a)                                      (b)
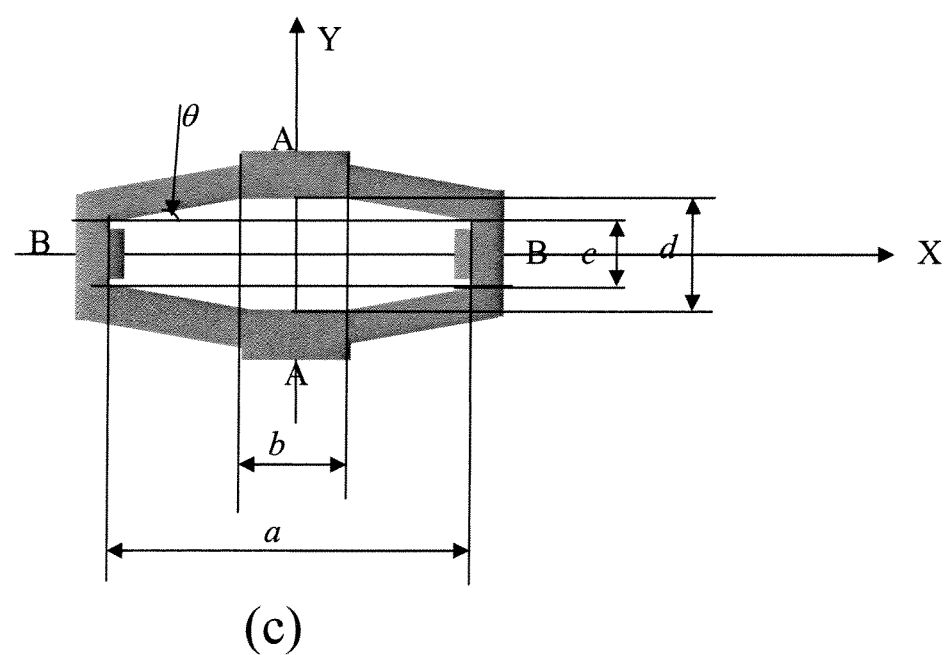
(c)

400

MULTISTAGE FORCE AMPLIFICATION OF PIEZOELECTRIC STACKS

CROSS-REFERENCE TO RELATED APPLICATIONS

This patent application relates to U.S. Provisional Patent Application No. 61/414,815, filed Apr. 15, 2010, and claims the benefits of U.S. Provisional Patent Application No. 61/414,807, U.S. Provisional Patent Application No. 61/414,803, and U.S. Provisional Patent Application No. 61/324,445 (all of which were filed Nov. 17, 2010), which are incorporated by reference.

STATEMENT REGARDING FEDERALLY SPONSORED RESEARCH AND DEVELOPMENT

This invention was made in part with Government support under Grant Number NCC-1-02043 awarded by the National Aeronautics and Space Administration. The Government may have certain rights in this invention.

BACKGROUND OF THE INVENTION

Energy management is one of the most challenging issues in the world today. Accordingly, various energy harvesting technologies have gained attention, including harvesting energy from walking or other vibration sources using piezoelectric materials. Self-powered supply sources are an emergent need for, among other things, communication devices; sensor networks for infrastructures; health monitoring and active control for aircraft; and soldiers on the battleground. Traditionally, there are three kinds of energy resources: heat, solar, and motion/vibration. Among them, heat and solar energies are weather dependent, which cannot be controlled by our soldiers for harvesting energy in military applications. The only energy resource that can be controlled by our army and marine soldiers is motion/vibration energy. In addition, ocean surface waves are a huge motion energy resource for naval battlefields. Vibrations from engines or other motion structures in any kind of battlefield are the other motion energy resources to be harvested. A piezoelectric structure is one of the common devices used to harvest motion/vibration energy. For aeronautic and space missions, piezoelectric energy harvesting transducers can harvest energy for auxiliary energy and reduce noise in aircraft. Historically, most researchers focused on cantilever based energy harvesting devices, which work at a resonance mode to harvest motion/vibration. See, e.g., S. Beeby, M. Tudor, and N. White, "Review Article: Energy harvesting vibration sources for microsystems applications," *Measurement Science and Technology*, 17 R175-R195, 2006; and S. Anton and H. Sodano, "Topical Review: A review of power harvesting using piezoelectric materials (2003-2006)." *Smart Materials and Structure* 16 R1-R21, 2007. Some researchers demonstrated that a flextensional (Moonie) transducer offers more efficiency to harvest energy than a cantilever based device. See, e.g., H. Kim, S. Priya, H. Stephanou, and K. Uchino, "Consideration of Impedance Matching Techniques for Efficient Piezoelectric Energy Harvesting," *IEEE Tran, UFFC* 54(9), 2007. A broadband, high efficiency motion/vibration energy harvesting device to harvest human motion energy, wind energy, ocean surface wave, as well as environmental vibration energy that can tap such unconventional but viable energy sources remains a goal of many scientists.

Review of conventional piezoelectric energy harvesting transducer (PEHT) structures, revealed that most effective piezoelectric constants are lower than about $10^4$ pC/N, (resonant mode). This is, obviously, the main reason why such conventional PEHTs cannot harvest enough electric power. Recent technology developments have focused on hybrid piezoelectric stack materials that include layered electromechanical improvements in order to increase conversion efficiency in promising ways, such as, for example, U.S. Pat. No. 7,446,459 and U.S. Patent Application Pub. No. 2010/0096949, which are both incorporated herein by reference thereto in their entirety. However, continued improvement is sought in other parts of PEHT structures, including mechanisms for directing and amplifying forces into such stack materials.

Further, for a specific vibration/motion resource, there needs to be a means to couple more mechanical energy from the vibration structure into a piezoelectric device and a means to convert a greater fraction of such mechanical energy into electrical energy. First, in order to couple the mechanical energy into PEHTs more effectively, the PEHT structure needs to be optimized and defined by the natural and environment of the vibration/motion resource. The performance of the PEHT device design depends on the piezoelectric properties and the form of the piezoelectric material. Piezoelectric materials with higher electromechanical coupling factors and piezoelectric constants may be preferred. Moreover, piezoelectric multilayers may improve reliability, durability, energy storage capability and integration capability.

In addition, many civilian and military applications require high performance electromechanical actuators. These include vibration control, dynamic flow control in aerospace, underwater navigation and surveillance, microphones, etc. High displacement and high electromechanical output power are two main demands for actuators needed in many applications. Historically, a great deal of effort has been devoted to two research fields: 1) the development of electromechanical active materials offering the desired properties and 2) the development of electromechanical devices which utilize the materials in an efficient manner. Since the development of metal ceramic actuators (called "Moonies"), many device configurations have been exploited for amplified displacement and enhanced efficiency.

In order to improve mechanical energy output, hybrid actuation system (HYBAS) may be used to utilize the characteristics of the electromechanical performance of these two types of electroactive materials in cooperative and effective way. Such a system shows significantly-enhanced electromechanical performance compared to the performance of devices made of each constituent material individually. A theoretical model for the HYBAS considers the elastic and electromechanical properties of the materials utilized in the system and the device configuration. Other actuator technologies (synthetic jet) include piezoelectric hybrid energy harvesting transducer (HYBERT), piezo triple hybrid actuation system (TriHYBAS), and piezoelectric multilayer-stacked hybrid actuation/transduction systems (Stacked-HYBATS) based on the understanding of the electromechanical properties of piezoelectric materials and their applications.

BRIEF SUMMARY OF THE INVENTION

In view of the foregoing, it is an object of the invention to provide a system and method using multistage force amplification of piezoelectric energy harvesting transducers (MFAPEHTs). In this MFAPEHT, a multistage force amplification mechanism is employed to increase the effective piezoelectric constant and optimize the mechanical impedance match in order to increase mechanical energy input to the device with same mechanical vibration source. Aspects of MFAPEHTs may include a configuration that enables to amplify the input mechanical vibration force to more than one order of amplitude to apply every layer of the piezoelectric multilayer stacks. Further, a MFAPEHT can reduce the input stiffness of the PEHT to match the mechanical impedance of a mechanical vibration media and to increase the mechanical energy absorption from environments. In addition, the MFAPEHT structure can increase the effective piezoelectric constant in order of amplitudes. Moreover, the force amplification mechanism of the MFAPEHT may not affect the overall capacitance. Also, experimental data shows that the harvested electric power is proportional to the square of the amplitude of the force amplification when piezoelectric material working in linear range. Further, no share force is applied to the piezoelectric multilayer stack and compress stress is dominated in the MFAPEHT. Therefore, the MFAPEHT may have higher reliability and broad range of working stresses. Further, the same-sized MFAPEHT compared to a conventional PEHT, the MFAPEHT is capable to harvest electric power more than order of higher than a conventional PEHT. Also, the MFAPEHT can be used broadly for portable electronic devices for military and civilian applications such as aircraft, automobile and other transportation equipment to harvest waste mechanical energy and reduces noise.

In another embodiment of a MFAPEHT, relaxor piezoelectric single crystal multilayer stacks for energy harvesting transducers (RPSEHT), can also provide significant improvements over the current state of the art. Research developments have demonstrated that PMN-PT and PZN-PT relaxor single crystal materials have high piezoelectric constants (d33>1500 pC/N) and high electromechanical coupling factors (k33>88%) as well as advantageous cryogenic properties. Further, RPSEHT is capable of converting more than 50% of mechanical energy input into electrical energy out using relaxor piezoelectric single crystal materials, which possess greater than 80% mechanical-electrical coupling factors. In addition, the RPSEHT remains high energy conversion efficiency, i.e., high mechanical-electrical coupling factor, in a broad range of temperatures (from 70 C to at or near cryogenic temperatures). Moreover, the RPSEHT enable harvesting energy with high efficiency in both of off-resonance mode a resonance mode in a broad range of frequencies. Also, the RPSEHT structure increases the effective piezoelectric constant by an order of magnitude comparing with that of its piezo ceramic counterpart. The RPSEHT can harvest more electric charges compared to a single layer bulk relaxor piezoelectric single crystal of the same size given the same applied vibration motion force due to the high effective piezoelectric constraint of the RPSEHT. Further, the RPSEHT structure can increase the capacitance by order of magnitude such that it can translate into an increase in the energy storage capability and a reduction of magnitude in voltage. In addition, the RPSEHT structure can be scaled to any size and integrated into a vibration/motion system. Moreover, RPSEHT structure is more reliable and durable for applications in dynamic systems as well as portable electronic devices in military and civilian applications such as aircraft, automobiles, and other vehicles to harvest waste mechanical energy. Also, the RPSEHT may enable to reduce harmful vibration/noise significantly in various ranges of frequencies and temperature environments when applied.

In order to enhance the mechanical energy output to obtain high displacement, large mechanical load capability (high blocking force) and high displacement height ration with low applied voltage for actuator transducer, a secondary amplification of multiple flextensional actuations system (SAMFATS) is disclosed. The SAMFATS can provide several times larger displacement than a similarly sized flextensional actuator/transducer with the same level of mechanical load capability. Further, the SAMFATS has strong resonance for transducer applications. Moreover, the SAMFATS provides extremely high effective piezoelectric constant at resonance frequency and off-resonance frequencies. The effective piezoelectric constant can be controlled by varying the size of each component, the degree of the precurvature of the frames, the thickness of each layer in the multilayer stacks, and the piezoelectric materials used. In addition, the SAMFATS can offer high displacement height ratio (or effective device strain) as well as work in a broad temperature range (from Liquid nitrogen temperature to >100 C), and preferably in at least some embodiments at or near cryogenic conditions. Further, the performance of SAMFATS can always be improved by enhancing the piezoelectric material properties. In addition, a SAMFATS device enables future actuator designs and expands piezoelectric material applications.

Embodiments of the disclosure include an apparatus for using a piezoelectric device, that includes an outer flextensional casing, a first cell and a last cell serially coupled to each other and coupled to the outer flextensional casing such that each cell having a flextensional cell structure and each cell receives an input force and provides an output force that is amplified based on the input force. The apparatus further includes a piezoelectric stack coupled to each flextensional cell structure of each cell wherein the piezoelectric stack of each flextensional cell structure provides piezoelectric energy based on the output force for each cell. Further, the last cell receives an input force that is the output force from the first cell and the last cell provides a first output apparatus force that is the product of the input apparatus force, the output force of the first cell, and the output force of the last cell. In addition, the piezoelectric energy harvested is based on the first output apparatus force. Moreover, the apparatus provides displacement based on the first output apparatus force. Each flextensional cell structure receives the input force along a first axis and provides the output force along a second axis that is amplified compared to the first input force. Also, a voltage is applied to each piezoelectric stack and a stiffness of the apparatus may be reduced to increase amplification of each input force for each cell.

The apparatus may further include one or more intermediate cells serially coupled to each other, each intermediate cell having a flextensional cell structure and each intermediate cell receives an input force and provides an output force that is amplified based on the input force wherein the one or more intermediate cells integrated into the apparatus such that the one or more intermediate cells are serially coupled between the first cell and the last cell. Further, the output force of the first cell is the input force of a first intermediate cell and the output force of a last intermediate cell is the input force of the last cell as well as a second output apparatus force that is the product of the input force, of the first cell, the output force of the first cell, the output force of each intermediate cell, and the output force of the last cell. In addition, the piezoelectric energy harvested is based on the second output apparatus force. Moreover, apparatus provides displacement based on the second output apparatus force. Also, the piezoelectric stack is a relaxor piezoelectric single crystal multilayer stack.

Embodiments of the disclosure may also include methods for using a piezoelectric device, the method including steps for providing outer flextensional casing and a first cell and a last cell of a transducer coupled to the outer flextensional casing, each cell having a flextensional cell structure that includes a piezoelectric stack coupled to each flextensional cell structure of each cell. Such a method may also include receiving an input force at the first cell, amplifying the input force at the first cell to provide an output force for the first cell, receiving the output force of the first cell as the input force of the last cell, and amplifying the input force at the last cell to provide an output force for the last cell. Further, a first transducer output force is product of the input force of the first cell, the output force of the first cell, and the output force of the last cell. Additional steps in the method may include providing piezoelectric energy from the piezoelectric stack of each flextensional cell structure of each cell based on first transducer output force as well as providing displacement based on the first output transducer force. Further steps may include receiving the input force along a first axis at each flextensional cell structure and providing the output force along a second axis that is amplified compared to the first input force as well as reducing the stiffness of the transducer thereby increasing the amplification of the each input force for each cell and applying a voltage to each piezoelectric stack.

Moreover, steps in the method may include providing one or more intermediate cells serially coupled to each other, each intermediate cell having a flextensional cell structure and each intermediate cell receives an input force and provides an output force that is amplified based on the input force wherein the one or more intermediate cells are integrated into the transducer such that the one or more intermediate cells are serially coupled between the first cell and the last cell. Further steps may be providing the output force of the first cell as the input force of a first intermediate cell, providing the output force of a last intermediate cell as the input force of the last cell and providing a second output transducer force that is the product of the input force, of the first cell, the output force of the first cell, the output force of each intermediate cell, and the output force of the last cell. Additional steps may be harvesting the piezoelectric energy based on the second output transducer force as well as providing displacement based on the second output transducer force. The piezoelectric stack may be a relaxor piezoelectric single crystal multilayer stack.

Another embodiment of the present disclosure may be an apparatus for harvesting energy from a piezoelectric device, the apparatus including an outer flextensional casing, a first cell and a last cell serially coupled to each other and the outer flextensional casing, each cell having a flextensional cell structure and each cell receives an input force and provides an output force that is amplified based on the input force, and a relaxor piezoelectric single crystal-based multilayer stack (piezoelectric stack) coupled to each flextensional cell structure of each cell wherein the piezoelectric stack of each flextensional cell structure provides piezoelectric energy based on the output force for each cell. Further, the last cell receives an input force that is the output force from the first cell and the last cell provides a first output apparatus force that is the product of the input apparatus force, the output force of the first cell, and the output force of the last cell and the piezoelectric energy harvested is based on the first output apparatus force. In addition, each flextensional cell structure receives the input force along a first axis and provides the output force along a second axis that is amplified compared to the first input force.

Moreover, the apparatus may include one or more intermediate cells serially coupled to each other, each intermediate cell having a flextensional cell structure and each intermediate cell receives an input force and provides an output force that is amplified based on the input force wherein the one or more intermediate cells integrated into the apparatus such that the one or more intermediate cells are serially coupled between the first cells and the last cells. Further, the output force of the first cell is the input force of a first intermediate cell and the output force of a last intermediate cell is the input force of the last cell. In addition, a second output apparatus force that is the product of the input force, of the first cell, the output force of the first cell, the output force of each intermediate cell, and the output force of the last cell and the piezoelectric energy harvested is based on the second output apparatus force.

BRIEF DESCRIPTION OF THE SEVERAL VIEWS OF THE DRAWING(S)

FIGS. 1A-1C are exemplary functional block diagrams of a MFAPEHT, specifically a two stage force amplification piezoelectric energy harvesting transducer (TSAFAPETS), in accordance with aspects of the present disclosure;

FIG. 3 is an exemplary functional block diagram of a first amplification unit of a TFAPETS, in accordance with aspects of the present disclosure;

DETAILED DESCRIPTION OF THE INVENTION

Figure 2:
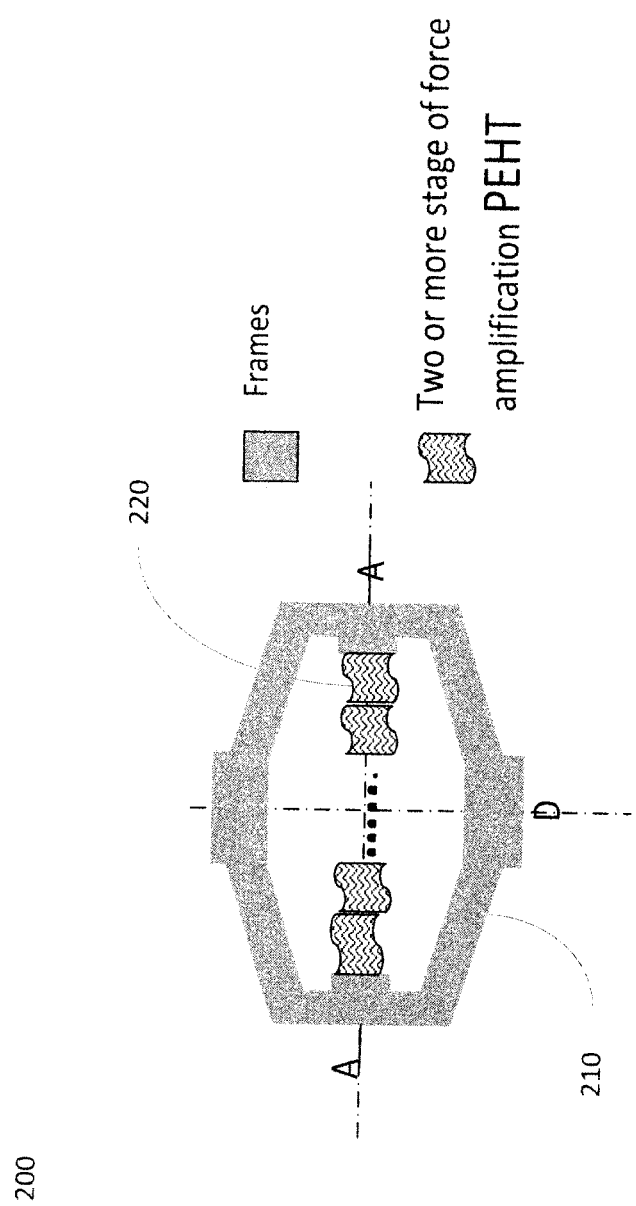
FIG. 2 is an exemplary functional block diagrams of a MFAPEHT, in accordance with aspects of the present disclosure.

In this section, the structure of a MFAPEHT and the multiple stages of force amplification mechanism are described first. The theoretical models for force amplification, piezoelectric constant amplification, and vibration energy harvesting for the MFAPEHT are developed. Then, the impedance issues to enhance the mechanical energy input to the MFAPEHT are briefly addressed. Finally, the experimental validation for MFAPEHT is presented.

FIGS. 1A-C shows an exemplary two-stage force amplification of PEHT (TSFAPEHT) (100, 150). FIG. 1(a) is a front cross section view of the TSFAPEHT and FIG. 1(b) is a top cross section view. The TSAFAPEHT includes an outer flextensional casing structure 110 (120 viewed in the top cross section view in FIG. 1(b) that surrounds one or more cells 130. Each cell includes a flextensional cell structure 125 that may be made of a metal frame that surrounds a piezoelectric stack 135. In one embodiment the piezoelectric stack 135 may be a multilayer stack. Further, FIG. 1(c) is an exemplary functional diagram of a fabricated TSFAPEHT with an outer flextensional casing structure 170 orthogonal to the one or more cells 160 such that each cell includes a flextensional cell structure 180 and a piezoelectric stack 190.

When an external force is applied to the TSFAPEHT in the AA direction (See FIG. 1(a)), the force is amplified, by a factor of M1 in the BB direction through the first stage of amplification. Further amplification, by a factor of M2, is through lengthening of the secondary stage amplification frame from the BB direction to the CC direction. Thus, if the coupled force in the AA direction is F, then the applied force to the piezoelectric multilayer stack in CC direction is M1*M2*F for each layer of the three multilayer stacks. The amplified force yields more electric charges than a same force applied into a PEHT.

In a further embodiment, when the PMS in FIGS. 1A-1C are relaxor piezoelectric single crystal multilayers stacks then the MFAPEHT shown FIGS. 1A-1C may act as a RPSEHT with the advantages of such a device described in the present disclosure.

In an alternative embodiment, the flextensional structure shown in FIGS. 1A-1C can be used in a secondary amplification multiple flextensional actuation system (SAMFATS). Thus, the functional block diagram shown in FIGS. 1A-1C can be described as serially coupled multiple piezoelectric multiplayer stacks (PMS)-based flextensional actuators. The PMS is the active element in such a flextensional actuator. When a voltage is applied to the PMSs, the PMSs expand along their length. This causes the series of three flextensional cell structures to shrink along its serial direction with amplified displacement (amplification factor M1). Such shrinkage may drive the outer flextensional casing to expand along its height with the secondary amplification of displacement (amplification factor M2). Thus, the SAMFATS structure can offer a large displacement with a high mechanical load capability in relatively small dimension actuator.

In order to further amplify the force applied to a PEHT and reduce the external stiffness of a PEHT, a multistage force amplification of piezoelectric energy harvesting transducer (MFAPEHT) 200 is shown diagrammatically in FIG. 2. Multiple (more than two) TSFAPEHTs, 220, as shown in FIG. 1, are serially connected in AA direction and integrated into an outer flextensional casing 210. Exemplary flextensional casings may be found in U.S. Pat. Nos. 4,999,819 and 5,276,657, which are incorporated by reference. Similarly, more stages of force amplification. i.e. MFAPEHTs 200, as shown in FIG. 2, could be integrated according to the mechanical matching with the vibration source to input more mechanical waste energy into a PEHT. A person of ordinary skill in the art would understand that the term "stage" may be interchanged with "cell."

The diagram of a first amplification unit is shown in FIG. 3. The schematic of the first amplification unit is drawn in the FIG. 3a. There are three piezoelectric multilayer stacks (PMSs) inside an outer flextensional casing. An exemplary functional block diagram of a PMS is shown in FIG. 3(b). The piezoelectric materials can be piezoelectric ceramic either in single crystal or in polycrystalline. In addition, the PMS can be replaced with piezoelectric polymers or electroactive materials with a DC bias. Referring to FIG. 3(c), when a dynamic force $F_y$ is applied to the AA direction, an amplified force $F_x$ is exerted in the BB direction. The amplitude M of the frame is:

$$F_x = (\cot \theta) F_y = M F_y \tag{1}$$

where $$\cot \theta = \frac{(a-b)/2}{(d-c)/2} = \frac{a-b}{d-c} \tag{2}$$

The amplitude of amplification M is dependent on the angle θ of the frame if the frame is rigid. For a multistage amplification, the total amplitude of the force amplification is:

$$\sum M = M_1 M_2 \ldots M_N = \prod_{i=1}^{N} M_i \tag{3}$$

The final internal force $F_{in}$ applied to an individual PMS is:

$$F_{in} = \left( \prod_{i=1}^{N} M_i \right) F_{et} \tag{4}$$

where $F_{et}$ is the external force applied to the MFAPEHT.

If each of the PMSs in the MFAPEHT is made of p layers of piezoelectric material with piezoelectric constant at $d_{33}$, and totally q pieces of PMSs are employed in the MFAPEHT, the effective piezoelectric, constant of the MFAPEHT, observed from the external of the MFAPEHT, is:

$$d_{effective} = \left( \prod_{i=1}^{N} M_i \right) p q d_{33} \tag{5}$$

When one designs a MFAPEHT, the maximum stress applied to the PMS is limited by the intrinsic property of the piezoelectric material. Therefore, the allowed maximum internal force, $F_{inM}$, directly applied to the PMS, divided by maximum vibration force is the limitation of $\Sigma M$, i.e., $$\sum M \leq \frac{F_{inM}}{F_{et}} \tag{6a}$$

$$F_{inM} = X_{max} A \tag{6b}$$

where $X_{max}$ is the maximum stress allowed for the piezoelectric material, and A is the area of cross-section of an individual PMS in the MFAPEHT.

In addition, the generated electric field in the PMSs of the MFAPEHT must be lower than the coercive electric field of the piezoelectric material. Simultaneously, the stiffness of the outer flextensional casing is dependent on the mechanical stiffness of the vibration medium to ensure that maximum mechanical energy is fed into the MFAPEHT.

A calculation was performed in order to estimate the theoretical energy that could be harvested. Accordingly, in order to collect all the produced electric power to one energy harvesting circuit and store the energy into one battery, the PMSs are electrically connected in parallel.

Figure 4:
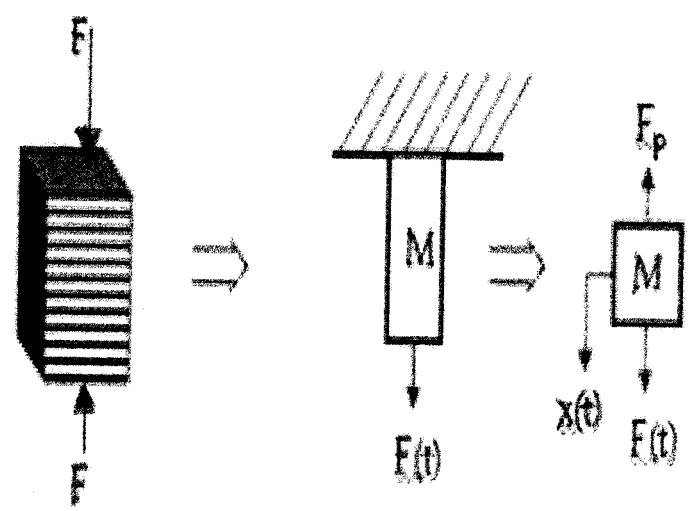
FIG. 4 is an exemplary functional block diagram of piezoelectric multilayer stack (PMS) in a dynamic situation, in accordance with aspects of the present disclosure.

FIG. 4 is an exemplary functional block diagram 400 of piezoelectric multilayer stack (PMS) in a dynamic situation. Further, FIG. 4 shows the equivalent circuit of dynamic response for a PMS.

The linear constitutive equations for piezoelectric materials are:

$$S_3(t) = s_{33}^E T_3(t) + d_{33} E_3(t) \tag{7a}$$

$$D_3(t) = d_{33} T_3(t) + \epsilon_{33}^T E_3(t) \tag{7b}$$

where $S_3(t)$ is the strain, $S_{33}$ is the elastic compliance, $T_3(t)$ is the stress, $d_{33}$ is the piezoelectric constant, $E_3(t)$ is the electric field, $D_3(t)$ is the electric displacement, $\epsilon_{33}$ is the dielectric permittivity, and the subscripts represent the direction of each property. The equation (7a) defines the mechanical response of material while the equation (7b) defines the electric response.

If the MFAPEHT works in a certain range of frequencies, the MPS can be assumed to be subjected to a known compression from the experimental characterization. Then, the equations (7a) and (7b) can be simplified using the following relationships:

$$S_3(t) = \frac{x(t)}{L}, T_3(t) = \frac{F(t)}{A}, E_3(t) = \frac{v(t)}{t}, D_3(t) = \frac{Q_3(t)}{A} \tag{8}$$

where x(t) is the displacement, Q(t) is the electric charge, L is the length of the PMS, t is the thickness of each individual piezoelectric layer in the PMS, A is the cross-section area, F(t) is the force applied to the PMS, and v(t) is the voltage. Since each PMS made of p layers, then, $$L = pt \tag{9}$$

$$F(t) = F_{in}(t) = \left(\prod_{i=1}^{N} M_i\right) F_{et}(t) \tag{10}$$

Substituted (8)~(10) into (7), the constitutive equations can be rewritten as:

$$x(t) = \frac{L}{EA}\left(\prod_{i=1}^{N} M_i\right) F_{et}(t) + \frac{d_{33}}{t} Lv(t) \tag{11}$$

$$Q(t) = d_{33} pq \left(\prod_{i=1}^{N} M_i\right) F_{et}(t) + \frac{pq\varepsilon_{33}^T At}{t} v(t) \tag{12}$$

The capacitance of the PMSs in the MFAPEHT is:

$$C = pq\frac{\varepsilon_{33}A}{t} \tag{13}$$

When no energy storage is connected to the MFAPEHT, the voltage charge relation is $$v(t) = \frac{Q(t)}{C} \tag{14}$$

Substitute the piezoelectric force in equation (11), the mechanical response of the system to be written as:

$$M\ddot{x} = -F_p(t) + F(t) \Rightarrow M\ddot{x} + \frac{EA}{L}x(t) - \frac{d_{33}AE}{t}C^{-1}Q(t) = F(t) \tag{15}$$

where M is the mass. The electric response can then be defined by solving in equation (12) and substituting the longitudinal stiffness k and the spring force F(t) in equation (10) to give $$v(t) = -d_{33} pq\left(\prod_{i=1}^{N} M_i\right) F_{et}(t) + \frac{Q(t)}{C} \tag{16}$$

When the dynamics of the system have been coupled to the electrical response of the PMS, the electric boundary conditions can be identified as the load resistance R $$v(t) = -R\dot{Q}(t) \tag{17}$$

Substituting Eq. (17) into Eqs. (15) and (16), the coupled electromechanical response of the MFAPEHT is given as:

$$M\ddot{x} + kx(t) - \frac{d_{33}kL}{t}C^{-1}Q(t) = F(t) \tag{18}$$

$$R\dot{Q}(t) - \frac{d_{33}pq}{C}\left(\prod_{i=1}^{N} M_i\right) F_{et}(t) + \frac{Q(t)}{C} = 0 \tag{19}$$

where $i(t)=\dot{Q}(t)$, and the voltage output of the MFAPEHT across the load resistance is defined as $v(t)=R\dot{Q}(t)$. Then, the power output can be calculated assuming that the load impedance will be the same as the source impedance, i.e., $$Z = \frac{1}{j\omega C} = \frac{t}{j\omega pq\varepsilon_{33}^T A} \tag{20}$$

where ω is the frequency of the external alternative force and j is the complex impedance of the capacitive PMS. Utilizing the defined impedance in Eq. (20), the power can be defined as:

$$P = \frac{v^2}{R} \tag{21}$$

where v is the rms value of v(t).

With the equations derived above, the electric response of the MFAPEHT can be calculated if the dynamic tension is known.

Vibration sources with different mechanical impedance transfer vibration energy from the vibration source to a PEHT. The ratio of energy transferred from one medium to the other is dependent on mechanical impedance matching of the two media. In order to harvest more energy from a fixed waste mechanical vibration, specific mechanical impedance, i.e., the stiffness of the PEHT, may he designed as close to the stiffness of the medium as possible. The outer flextensional casing or frame can reduce the stiffness of the PEHT based on such a principle. Further novel aspects of the disclosure include a method to further reduce the stiffness of the structure.

Figure 5:
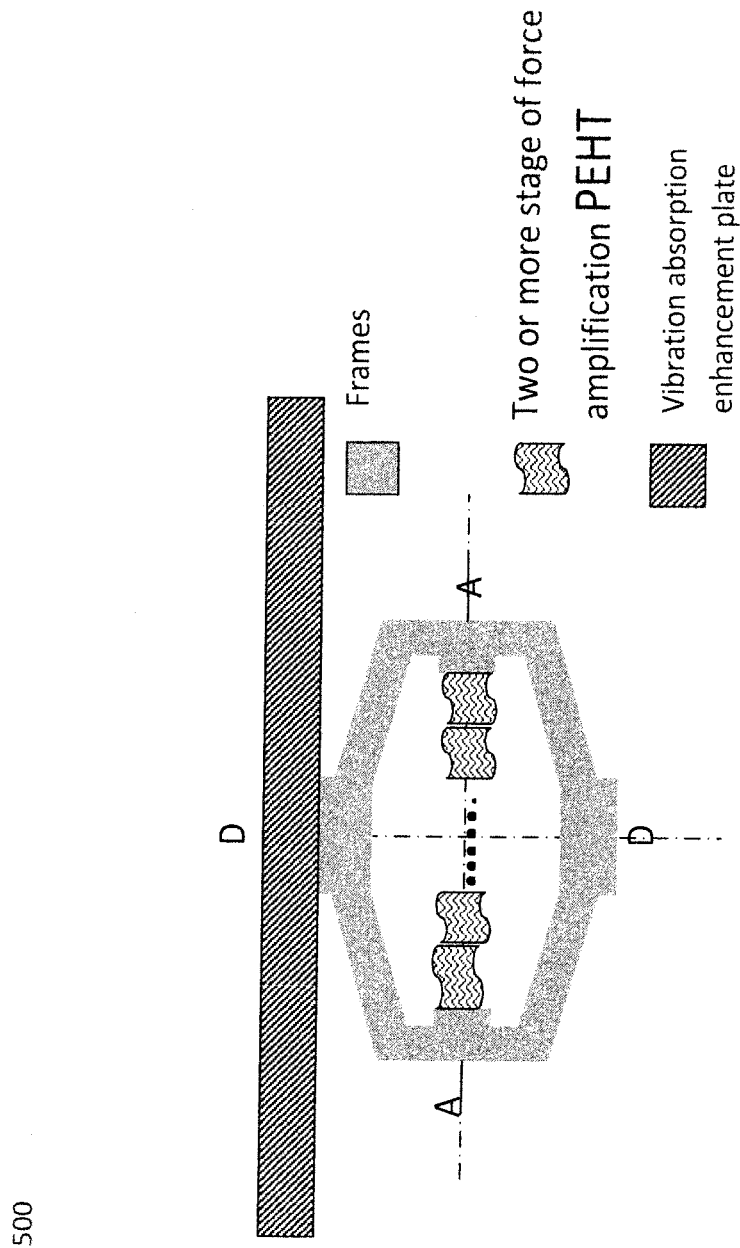
FIG. 5 is an exemplary functional block diagrams of a MFAPEHT coupled to a vibration enhancement plate, in accordance with aspects of the present disclosure.

For example, if the vibration medium is air with a small force intensity, the outer flextensional casing or frame can be designed to me much softer outside of the MFAPEHT. Alternatively, the flextensional cell structures which are close the PMS, may remain stiff with many stages of force amplification. Further, a vibration absorption enhancement plate may be added, as shown in FIG. 5 (500), to enhance the energy input to a MFAPEHT in the case of harvesting vibrations with air as the medium. The input energy can determined by $$E=AH \tag{22}$$

where, A is the area of the vibration absorption enhancement plate, and H is the linear energy density of the air vibration.

Figure 6:
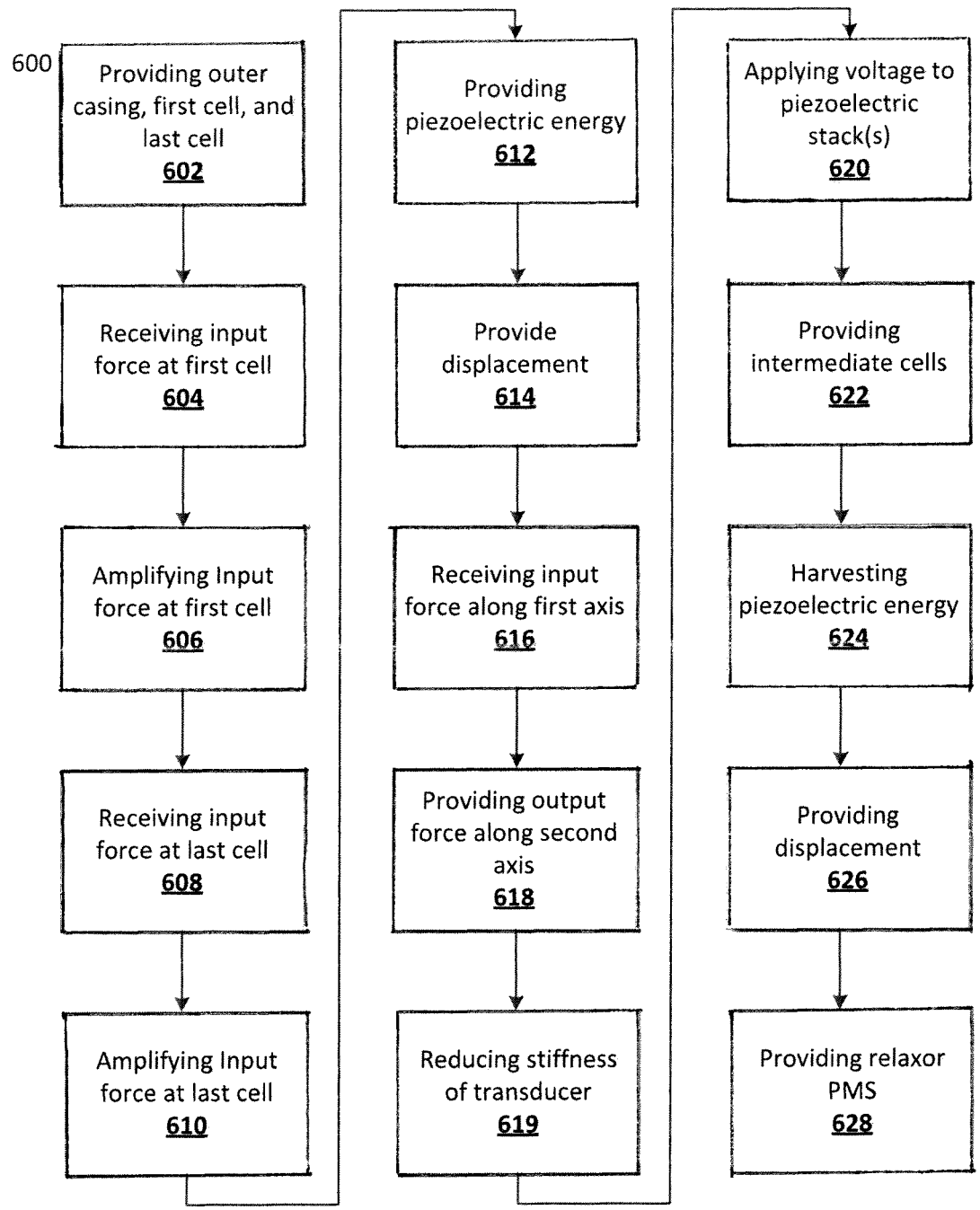
FIG. 6 is an exemplary flowchart showing example methods for harvesting energy and providing displacement using a transducer having piezoelectric stacks, in accordance with aspects of the present disclosure.

FIG. 6 is an exemplary flowchart 600 showing example methods for harvesting energy and providing displacement using a transducer having piezoelectric stacks, in accordance with aspects of the present disclosure. A person of ordinary skill in the art would understand that the steps shown in FIG. 6 may be implemented in any order and that only a subset of the steps shown in FIG. 6 may be implemented to harvest energy or provide displacement using a transducer having piezoelectric stacks. Steps in the example methods may include providing outer flextensional casing and a first cell and a last cell of a transducer coupled to the outer flextensional casing, as shown in block 602. Each cell may have a flextensional cell structure that includes a piezoelectric stack coupled to each flextensional cell structure. Further steps in the example methods may also include receiving an input force at the first cell, amplifying the input force at the first cell to provide an output force for the first cell, receiving the output force of the first cell as the input force of the last cell, and amplifying the input force at the last cell to provide an output force for the last cell, as shown in blocks 604-610. Moreover, a first transducer output force is product of the input force of the first cell, the output force of the first cell, and the output force of the last cell. Additional steps in the method may include providing piezoelectric energy from the piezoelectric stack of each flextensional cell structure of each cell based on first transducer output force as well as providing displacement based on the first output transducer force, as shown in blocks 612 and 614. Other steps may include receiving the input force along a first axis at each flextensional cell structure and providing the output force along a second axis that is amplified compared to the first input force, as shown in block 616 and 618. Another step in the example methods may include reducing the stiffness of the transducer thereby increasing the amplification of the each input force for each cell, as shown in block 619. A further step in the method may include applying a voltage to each piezoelectric stack, as shown in block 620.

Moreover, steps in the method may include providing one or more intermediate cells serially coupled to each other, as shown in block 622. Each intermediate may cell have a flextensional cell structure and each intermediate cell receives an input force and provides an output force that is amplified based on the input force wherein the one or more intermediate cells are integrated into the transducer such that the one or more intermediate cells are serially coupled between the first cell and the last cell. Further steps may he providing the output force of the first cell as the input force of a first intermediate cell, providing the output force of a last intermediate cell as the input force of the last cell and providing a second output transducer force that is the product of the input force, of the first cell, the output force of the first cell, the output force of each intermediate cell, and the output force of the last cell. Additional steps may be harvesting the piezoelectric energy based on the second output transducer force as well as providing displacement based on the second output transducer force, as shown in blocks 624 and 626. Moreover, the example methods may include providing a piezoelectric stack that may be a relaxor piezoelectric single crystal multilayer stack., as shown in bock 628.

An exemplary relaxor piezoelectric single crystal multilayer stack contains relaxor piezoelectric materials arranged in consistent polarization directions as layers with electrode and connection wires to form a circuit. In at least one embodiment, when an external force is application in the length direction, the force applied on each layer is the same. The electric charges produced on the two surfaces of each layer in the stack are the same as the force applied on a large piece of the same piezoelectric material. The multilayer structure increases the capacitance of the stack so it can store more electric charges. Such layers may include, without limitation PMN-PT or PZN-PT single crystal materials.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An apparatus for harvesting mechanical vibration/motion energy from a piezoelectric device, the apparatus comprising:
   an outer flextensional casing;
   a first cell and a last cell serially coupled to each other and coupled to the outer flextensional casing, each cell having a flextensional cell structure and wherein each cell receives an input force from the outer flextensional casing and provides an output force that is amplified based on the input force; and
   a piezoelectric stack coupled to each flextensional cell structure of each cell wherein the piezoelectric stack is comprised of multiple piezoelectric layers each connected serially to an electrode and wherein the piezoelectric stack of each flextensional cell structure provides the energy as electrical charges to the electrodes based on the output force received from each cell,
   wherein the last cell receives an input force that is the output force from the first cell and the last cell provides a first output apparatus force that is the product of the input apparatus force, the output force of the first cell, and the output force of the last cell, wherein the flextensional casing is arranged orthogonally with respect to the first cell and the last cell.

2. The apparatus of claim 1, wherein the energy harvested is based on the first output apparatus force.

3. The apparatus of claim 1, wherein the apparatus provides deformation based on the first output apparatus force.

4. The apparatus of claim 1, wherein each flextensional cell structure receives the input force along a first axis and provides the output force along a second axis that is amplified compared to the first input force.

5. The apparatus of claim 1, wherein the multiple piezoelectric layers of each piezoelectric stack are connected in parallel.

6. The apparatus of claim 1, wherein a voltage is applied to each piezoelectric stack.

7. The apparatus of claim 1, wherein an overall stiffness of the apparatus is reduced to increase amplification of each input force for each cell.

8. The apparatus of claim 1, the apparatus further comprising:
one or more intermediate cells serially coupled to each other, each intermediate cell having a flextensional cell structure and each intermediate cell receives an input force and provides an output force that is amplified based on the input force wherein the one or more intermediate cells integrated into the apparatus such that the one or more intermediate cells are serially coupled between the first cell and the last cell,
wherein the output force of the first cell is the input force of a first intermediate cell and the output force of a last intermediate cell is the input force of the last cell, and
wherein a second output apparatus force that is the product of the input force, of the first cell, the output force of the first cell, the output force of each intermediate cell, and the output force of the last cell.

9. The apparatus of claim 8, wherein the piezoelectric energy harvested in each piezoelectric stack is based on the second output apparatus force, a stiffness of that piezoelectric stack, a mechanical to electrical energy conversion efficiency of that piezoelectric stack, a frequency of the input force, and an interaction time.

10. The apparatus of claim 8, wherein the apparatus provides displacement based on the second output apparatus force and a stiffness of that piezoelectric stacks.

11. The apparatus of claim 1, wherein the piezoelectric are relaxor piezoelectric single crystal multilayer stacks.

12. A method for harvesting mechanical vibration/motion from a piezoelectric device, the method comprising:
providing an outer flextensional casing and a first cell and a last cell of a transducer coupled to the outer flextensional casing, each cell having a flextensional cell structure that includes a piezoelectric stack coupled to each flextensional cell structure of each cell, wherein the piezoelectric stack comprises multiple piezoelectric layers each connected to an electrode and the flextensional casing is arranged orthogonally with respect to the first cell and the last cell;
receiving an input force from the outer flextensional casing at the first cell;
amplifying the input force at the first cell to provide an output force for the first cell;
receiving the output force of the first cell as the input force of the last cell;
amplifying the input force at the last cell to provide an output force for the last cell; and
harvesting the energy as electrical charges at the electrodes,
wherein a first transducer output force is product of the input force of the first cell, the output force of the first cell, and the output force of the last cell and the energy is harvested based on the first transducer output force.

13. The method of claim 12, wherein the multiple piezoelectric layers of each piezoelectric stack are connected in parallel.

14. The method of claim 12, further comprising providing deformation based on the first output transducer force and an overall stiffness of the piezoelectric device.

15. The method of claim 12, the method further comprising:
receiving the input force along a first axis at each flextensional cell structure; and
providing the output force along a second axis that is amplified compared to the first input force.

16. The method of claim 15, wherein the multiple piezoelectric layers are layers of PMN-PT or PZN-PT single crystal materials.

17. The method of claim 12, the method further comprising reducing the stiffness of the transducer thereby increasing the amplification of the each input force for each cell.

18. The method of claim 12, the method further comprising applying a voltage to each piezoelectric stack.

19. The method of claim 12, the method further comprising:
providing one or more intermediate cells serially coupled to each other, each intermediate cell having a flextensional cell structure and each intermediate cell receives an input force and provides an output force that is amplified based on the input force wherein the one or more intermediate cells are integrated into the transducer such that the one or more intermediate cells are serially coupled between the first cell and the last cell; and
providing the output force of the first cell as the input force of a first intermediate cell, providing the output force of a last intermediate cell as the input force of the last cell and providing a second output transducer force that is the product of the input force, of the first cell, the output force of the first cell, the output force of each intermediate cell, and the output force of the last cell.

20. The method of claim 19, the method further comprising harvesting the piezoelectric energy based on the second output transducer force, a stiffness of each piezoelectric stack, a mechanical to electrical energy conversion efficiency of each piezoelectric stack, a frequency of the input force, and an interaction time.

21. The method of claim 19, the method further comprising providing deformation based on the second output transducer force and a stiffness of that piezoelectric stacks.

22. The method of claim 12, wherein the piezoelectric stack is a relaxor piezoelectric single crystal multilayer stack.

23. The method of claim 12, wherein the method is conducted at or near cryogenic temperature conditions.

24. An apparatus for harvesting mechanical vibration/motion energy through a piezoelectric device, the apparatus comprising:
an outer flextensional casing;
a first cell and a last cell serially coupled to each other and the outer flextensional casing, each cell having a flextensional cell structure and wherein each cell receives an input force from the outer flextensional casing and provides an output force that is amplified based on the input force; and
a relaxor piezoelectric single crystal-based multilayer stack (piezoelectric stack) coupled to each flextensional cell structure of each cell wherein the piezoelectric stack is comprised of multiple piezoelectric layers each connected to an electrode and wherein the piezoelectric stack of each flextensional cell structure provides the piezoelectric energy as electrical charges to the electrodes based on the output force received from each cell, wherein the last cell receives an input force that is the output force from the first cell and the last cell provides a first output apparatus force that is the product of the input apparatus force, the output force of the first cell, and the output force of the last cell, wherein the piezoelectric energy harvested is based on the first output apparatus force, and wherein the flextensional casing is arranged orthogonally with respect to the first cell and the last cell.

25. The apparatus of claim 24, wherein each flextensional cell structure receives the input force along a first axis and provides the output force along a second axis that is amplified compared to the first input force.

26. The apparatus of claim 25, wherein the multiple piezoelectric layers of each piezoelectric stack are connected in parallel.

27. The apparatus of claim 24, the apparatus further comprising:

one or more intermediate cells serially coupled to each other, each intermediate cell having a flextensional cell structure and each intermediate cell receives an input force and provides an output force that is amplified based on the input force wherein the one or more intermediate cells integrated into the apparatus such that the one or more intermediate cells are serially coupled between the first cells and the last cells, wherein the output force of the first cell is the input force of a first intermediate cell and the output force of a last intermediate cell is the input force of the last cell, and wherein a second output apparatus force that is the product of the input force, of the first cell, the output force of the first cell, the output force of each intermediate cell, and the output force of the last cell and the piezoelectric energy harvested is based on the second output apparatus force, a stiffness of that piezoelectric stack, a mechanical to electrical energy conversion efficiency of that piezoelectric stack, a frequency of the input force, and an interaction time.

* * * * *